Patented Nov. 6, 1928.

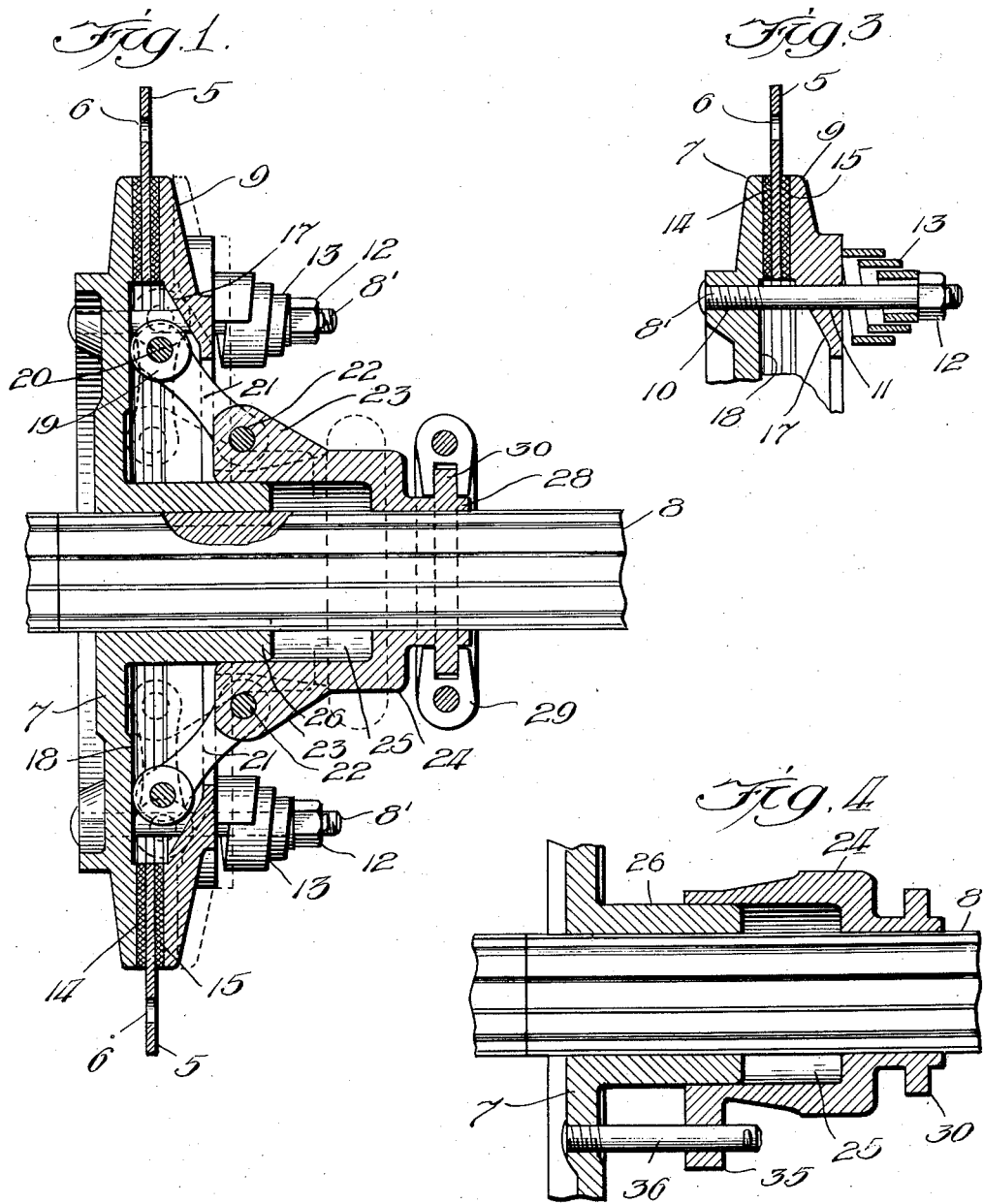

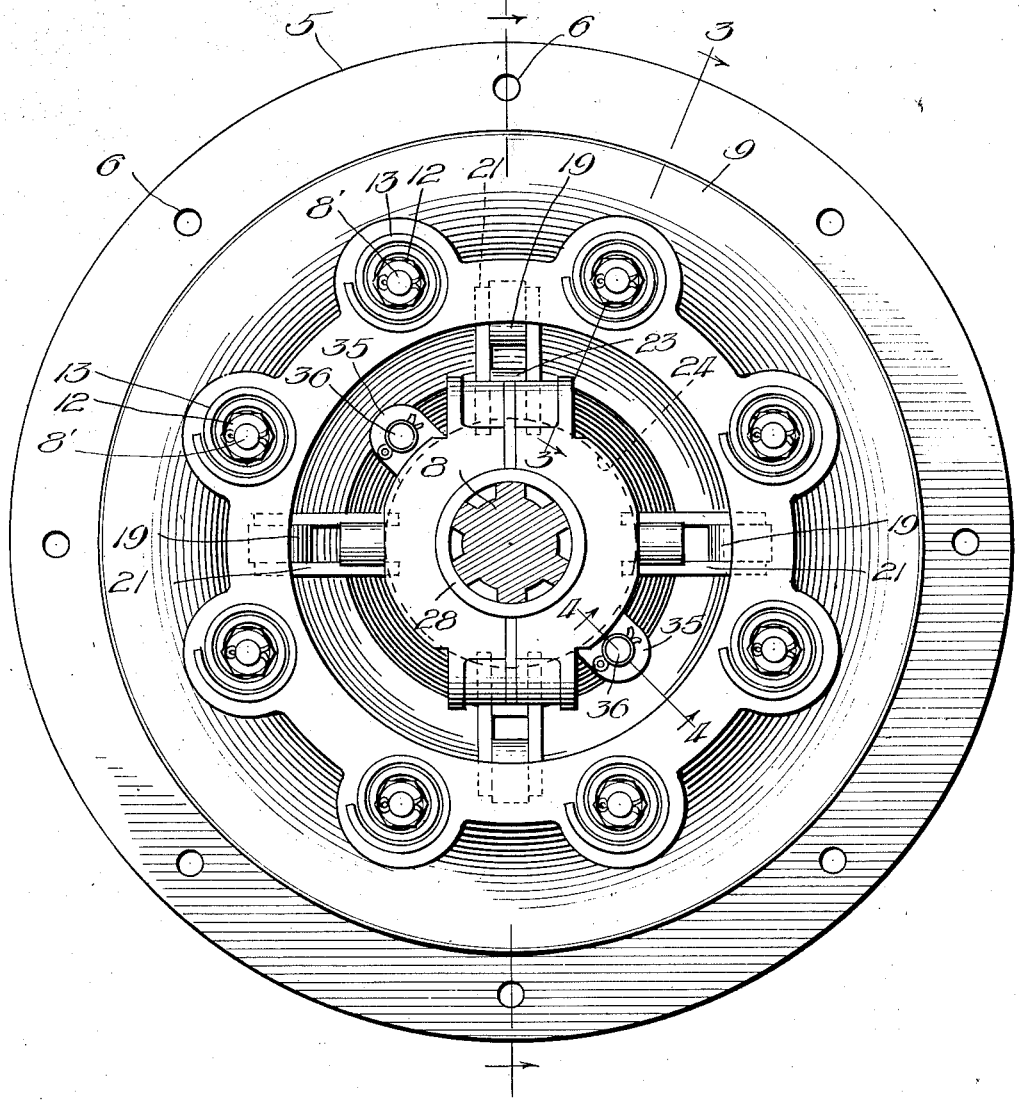

1,690,698

UNITED STATES PATENT OFFICE.

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN.

CLUTCH.

Application filed January 28, 1927. Serial No. 164,144.

My invention relates to that type of clutch in which a flat disc or plate is secured to the driven or driving member and engaged on opposite sides by a fixed and a floating or movable friction disk or member carried by the driving or driven member, and in which the floating friction member is forced into engagement with the intermediate plate by springs and released by manually operated means. The invention has for its object the provision of improved means of a simple and efficient construction for releasing the clutch.

In the drawings accompanying and forming a part of the specification:

Fig. 1 is an axial section of a preferred embodiment of my invention on the line 1—1 of Fig. 2;

Fig. 2 an elevation thereof on a plane perpendicular to the axis of the clutch;

Fig. 3 a radial section through a portion of the clutch on the line 3—3 of Fig. 2; and Fig. 4 an axial section on the line 4—4 of Fig. 2.

Each part is identified by the same reference character wherever it occurs in the several views.

The intermediate plate 5 is adapted for attachment to a rotating part such as the flywheel of a gas engine, being provided with holes 6 for this purpose. The fixed friction disk or member 7 is shown as keyed to the shaft 8 in the usual manner. The floating friction member or disk 9 is connected to the fixed disk 7 for rotation therewith by means of bolts 8', shown as eight in number, extending through registering bores 10, 11 in the fixed and floating members respectively, the bolts being threaded into the bores 10, see Fig. 3. The bolts extend a suitable distance beyond the outer face of the floating member and are threaded on their ends to receive nuts 12 between which and the outer face of the floating member are compressed springs 13. The adjacent faces of the fixed and floating friction members are provided with frictional material 14, 15 which may be of usual or approved character.

Inwardly of the friction band or area the inner face of the floating member is formed with a frusto-conical surface 17, which more nearly approaches the fixed friction member at its outer than at its inner periphery. The inner surface of the fixed member is flat or plane opposite said frusto-conical surface of the floating member, as at 18, so that the fixed and floating member together form an annular recess, the walls of which converge outwardly from the axis of the clutch. A plurality of rollers 19, here shown as four in number, are radially movable within said recess and of such diameter that when forced outwardly toward the outer periphery of the recess, they engage the side walls of the latter and serve to spread the fixed and floating members apart by forcing the latter back against the pressure of the springs to which reference has been made. The rollers are carried on spindles 20 mounted between the outer ends of links 21, the inner ends of which are pivoted on bolts 22 extending through lugs 23 on the actuating sleeve 24. The sleeve is hollowed out at 25 to slide at its inner end upon the hub 26 of the fixed member 7. At its outer end, as at 28, the sleeve slides upon the shaft 8, to which reference has been made. Any suitable means may be employed to move the sleeve in and out for disengaging the clutch and permitting its engagement. I have shown at 29 an ordinary form of actuating collar which embraces a flange 30 on sleeve 24. Any usual or approved means may be used for actuating the collar 29.

The construction is such that sleeve 24 when forced inwardly to release the clutch may be moved into a position to carry the pivots 22 of the links slightly beyond the plane of the roller journals 20 or, in other words, past the dead-center, so that the clutch may be releasably locked in the open or disengaged position.

As seen in Figs. 2 and 4, sleeve 24 is formed or provided with lugs 35 through which extend pins or bolts 36 secured to the fixed member 7 for the purpose of preventing relative rotary movement between said sleeve and fixed member and permitting the reciprocation of the sleeve axially of the clutch.

When the sleeve 24 is thrust inwardly or toward the fixed member of the clutch the rollers engage the converging surfaces on the fixed and floating members of the clutch, respectively, and force said members apart, thus releasing the clutch, and if the movement is continued to the limit the parts occupy the dotted line position in which the clutch is locked in the open condition. To engage the clutch it is necessary only to move the sleeve 24 outwardly beyond the dead center when the spring action completes the engaging movement. Manifestly, it is not essential that the spreading members 19 be rollers as other forms of blocks may be used, but rollers are appropriate for the purpose and reduce the frictional resistance to the opening of the clutch.

I claim:

1. In a clutch of the class described, an intermediate disk, a fixed and a floating friction member arranged respectively on opposite sides of said disk and adapted to engage the same, one of said members having a frusto-conical surface adjacent the other of said members, rollers intermediate said frusto-conical surface of the floating member and the adjacent surface of the fixed member and adapted when moved outwardly to force said members apart, an axially movable sleeve, links connecting said rollers to said sleeve, the construction being such that said links may be moved past their dead center to lock the clutch in open position, and springs pressing said floating member toward the fixed member.

2. In a clutch of the class described, an intermediate annular disk, friction members on opposite sides respectively of said intermediate disk having outer annular friction faces adapted to engage the intermediate disk, springs for forcing said members toward each other and into engagement with the intermediate disk, one of said friction members being formed on its side adjacent the other clutch member and adjacent its friction face with a radially inclined surface and having an enlarged central opening, elements radially movable between said inclined surface of the one friction member and the other friction member of such size, that when in their inner positions they are out of engagement with one of said members but when in outer position they hold the members away from the intermediate disk against the pressure of said springs and means extending through the central opening of the first-mentioned friction member and connected to the radially movable elements for forcing the latter outward.

3. In a clutch of the class described, an intermediate annular disk, friction members on opposite sides respectively of said intermediate disk having outer annular friction faces adapted to engage the intermediate disk, springs for forcing said members toward each other and into engagement with the intermediate disk, one of said members having a plane annular surface adjacent its friction face and a hub adapted to be splined upon a shaft, the other of said members having a frusto-conical annular surface adjacent the annular plane surface on the first-mentioned friction member, elements radially movable between said inclined and plane surfaces on the respective friction members, of such size, that when in their inner position they are out of engagement with one of said members but when in outer position they hold the members away from the intermediate disk against the pressure of said springs, a sleeve slidable upon the said hub of one of the members, links connecting the sleeve and said radially movable elements, and means for axially moving the sleeve.

In testimony whereof, I have subscribed my name.

WILLIAM J. PEARMAIN.